May 12, 1936.   J. LYON   2,040,615
MILK CAN OPENER
Filed Jan. 22, 1936   2 Sheets-Sheet 1
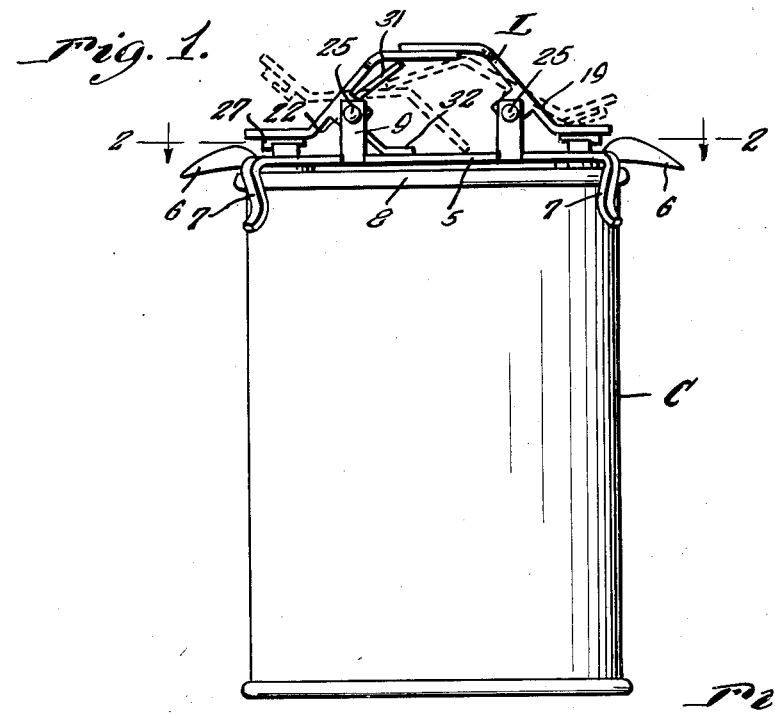
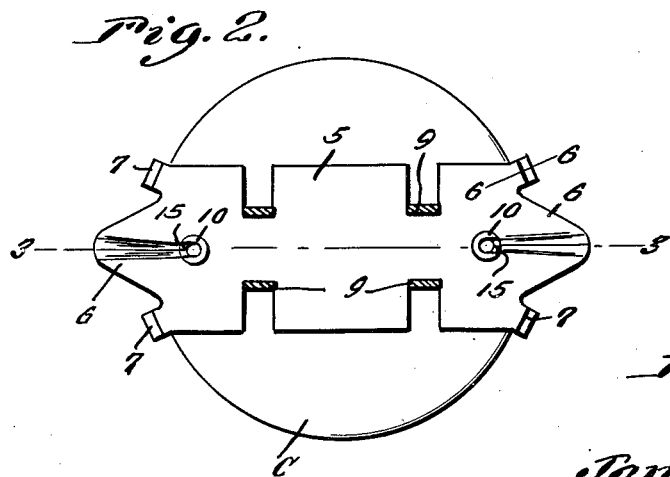
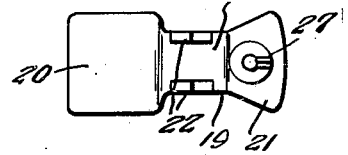
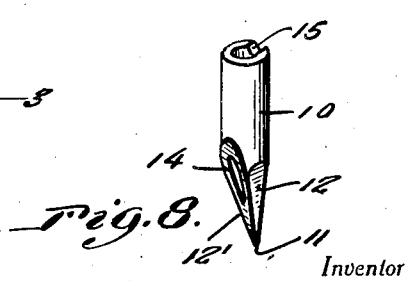
Inventor
James Lyon
By Clarence A. O'Brien and
Hyman Berman
Attorneys May 12, 1936.  J. LYON  2,040,615
MILK CAN OPENER
Filed Jan. 22, 1936  2 Sheets-Sheet 2
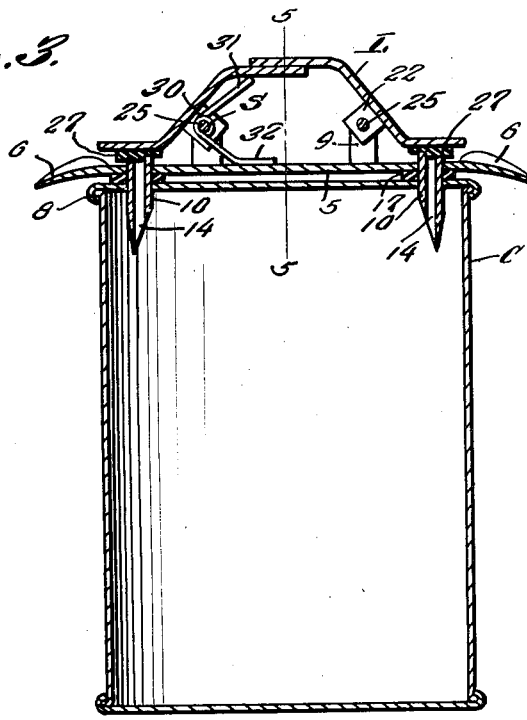
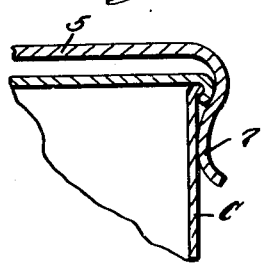
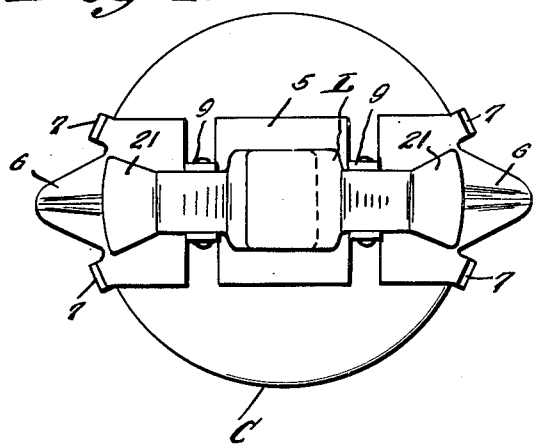
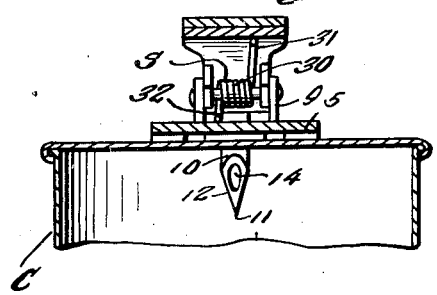
Inventor
James Lyon
By Clarence A. O'Brien and
Hyman Berman
Attorneys

UNITED STATES PATENT OFFICE 2,040,615

MILK CAN OPENER

James Lyon, Lillooet, British Columbia, Canada

Application January 22, 1936, Serial No. 60,310

1 Claim. (Cl. 221—23)

The present invention relates to a device for opening milk cans and the like and the prime object of the invention resides in the provision of a device which enables one to easily open milk cans or the like and to control the flow of the contents therefrom in an easy and convenient manner.

A further important object of the invention resides in the provision of a device of this nature which is easy to attach to and detach from the can and provides a high degree of sanitation, is easy to manipulate, compact and convenient in its arrangement of parts, thoroughly efficient and reliable in use and operation, and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:—

Figure 1 is a side elevation of a can showing my device mounted thereon.

Figure 2 is a horizontal sectional view taken substantially on the line 2—2 of Figure 1.

Figure 3 is a vertical sectional view taken substantially on the line 3—3 of Figure 2 looking horizontally through the device.

Figure 4 is a top plan view of the device and the can.

Figure 5 is a detail sectional view taken substantially on the line 5—5 of Figure 3.

Figure 6 is a detail section taken substantially on the line 6—6 of Figure 2.

Figure 7 is a bottom plan view of one of the valve levers.

Figure 8 is a perspective view of one of the prong conduits.

Referring to the drawings in detail it will be seen that the numeral 5 denotes an oblong plate formed at its ends with what I terminate as nose extensions 6 at the sides of which are downwardly extending arcuate snap fingers 7 to engage over the rim 8 of a can C for holding the plate thereon above the upper end thereof in spaced parallel position. Two pairs of ears 9 are struck from the side edges of the plate and extend upwardly, the ears of each pair being disposed in spaced coextensive relationship and the ears of one pair being equidistant from the center of the plate as respect to the other pair. Prong conduits 10 are fixed through openings in the plate 5 outwardly of the two pair of ears 9 and in alignment with a line drawn through the apices of the nose 6 and the true center of the plate 5. The bores of these conduits 10 are at right angles thereto or normally vertically disposed when the can is in upright position. Each conduit is provided with a point 11 formed by bevel surfaces 12 one of which 12' is more pronounced than the other and is inwardly disposed and the bore of the conduit opens in a sort of an elongated opening 14 therein. The upper end of the conduit is provided with a notch 15 diametrically opposite the opening 14.

Washers 17 are mounted on the conduits 10 below the plate 5 as shown to advantage in Figure 3.

A pair of levers of Z-shape is provided in connection with this device. These levers are denoted generally by the letter L. Each lever comprises an intermediate portion 19 and end portions 20 and 21. The end portions 20 overlap as shown to advantage in Figures 1 and 3. The intermediate portions 19 are provided with depending ears 22 pivotally engaged with the ears 9 on pivot pins 25 with the ends 20 in overlapped position as previously pointed out. The ends 21 engage over the upper ends of the piercing prong conduits 10 and are provided on their under faces with washers 27 to engage over the upper ends of the conduits 10 and the washers on their outer ends have underlapping portions to take care of the notches 15. A spring S is associated with each lever L and includes an intermediate coil portion 30 about the pin 25 and arms 31 and 32, the former impinging under end 20 and the latter impinging over the plate 5 thereby normally holding the washers 27 closed over the upper ends of the prong conduits 10.

A can of milk or the like is taken in one hand and my device is taken in the other hand and is forced down over the upper end of the can causing the prongs 10 to pierce the top of the can and to cause the snap fingers 7 to engage over the bead 8 thereof. Now when it is desired to pour milk or the like from the can all that it is necessary is to press down over the uppermost end 20 of the levers L and we provide a pouring opening and a vent opening.

It is thought that the construction, operation, utility and advantages of this invention will now be quite apparent to those skilled in this art without a more detailed description thereof.

The present embodiment of the invention has been described in considerable detail merely for the purpose of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

What is claimed is:—

A device of the class described comprising a plate, snap fasteners for engagement of the plate over the end of a can, prong conduits mounted in the plate adapted to pierce openings in the can, valve levers, ears rising from the plate, said valve levers in their intermediate portions being provided with ears, pins rockably mounting the ears of the levers on the ears of the plate, said levers, each being of a Z-shaped formation to provide intermediate portions from which said ears project and end portions, one end of each engaging over the prong conduits and the other ends being in overlapping position, and spring means associated with the valve levers normally holding the ends in engagement with the outer ends of the prong conduits, the last-mentioned means being in the form of springs having intermediate portions about pivot pins through the ears and having arms the upper arms of which impinge against the undermost upper end of the levers and the other arm against the plate.

JAMES LYON.